Dec. 15, 1964
G. NATTA ETAL
3,161,624
POLYMERIZATION OF STYRENE
Filed Feb. 15, 1957
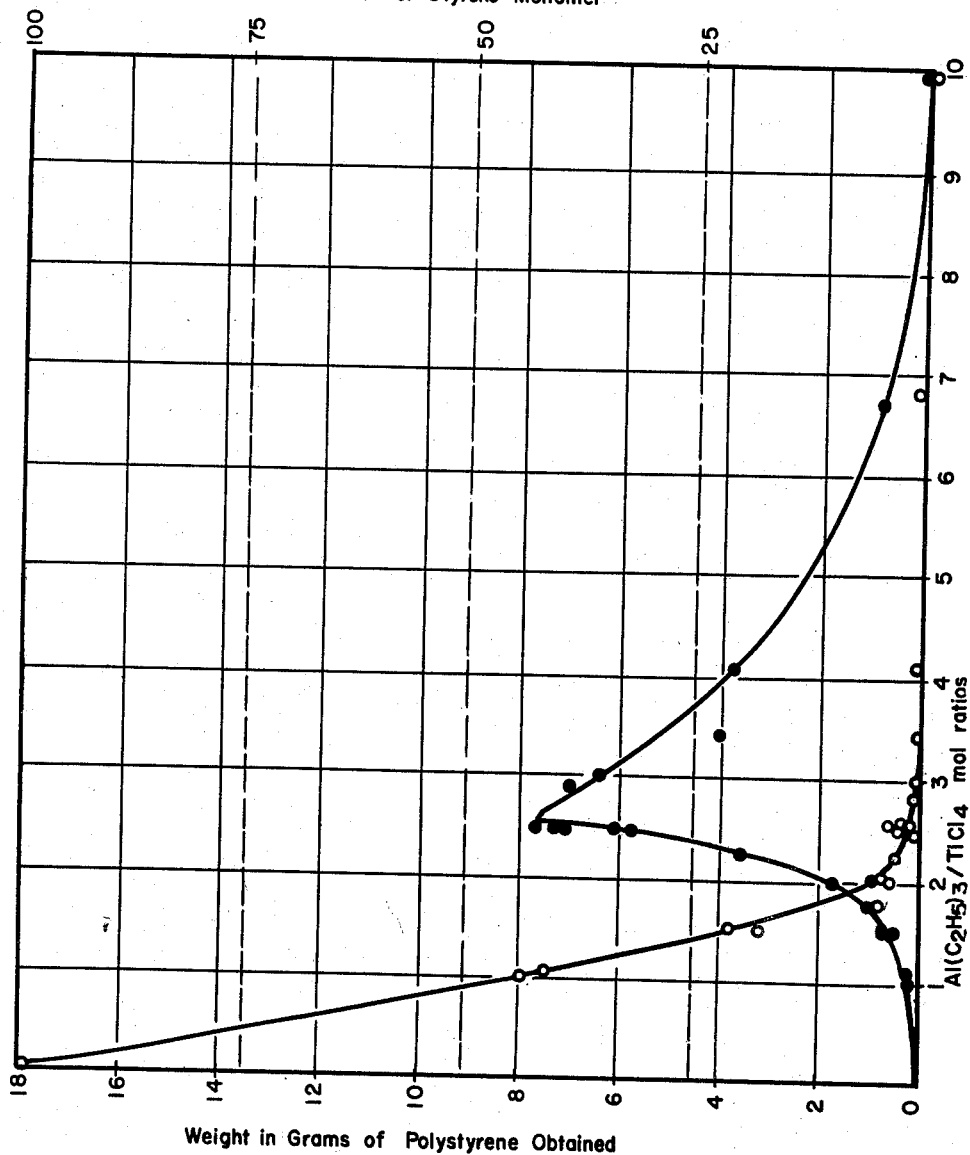
INVENTOR
GIULIO NATTA
FERDINANDO DANUSSO
DARIO SIANESI
BY
*Taulmin & Taulmin*
ATTORNEYS

United States Patent Office 3,161,624
Patented Dec. 15, 1964

3,161,624
POLYMERIZATION OF STYRENE
Giulio Natta, Ferdinando Danusso, and Dario Sianesi, Milan, Italy, assignors to Montecatini Società Generale per l'Industria Mineraria e Chimica, a corporation of Italy
Filed Feb. 15, 1957, Ser. No. 640,523
Claims priority, application Italy Feb. 24, 1956
6 Claims. (Cl. 260—93.5)

This invention relates to isotactic polymers of styrene and to methods for making them.

The polymerization of styrene to a homopolymerizate comprising isotactic macromolecules with the aid of catalysts containing transition metals and metallo-alkyl linkages, in particular catalysts obtained from titanium tetrachloride and aluminum alkyl compounds has been described by one of us, G. Natta. The styrene polymerizate obtained previously as aforesaid was always accompanied by more or less large amounts of amorphous macromolecules of low molecular weight which could be separated by extraction of the crude polymerizate with acetone.

It was also shown previously that a practically pure isotactic (crystallizable) polystyrene could be produced by a rather complex process using a catalyst prepared by adding a solution of titanium tetrachloride to a solution of aluminum triethyl, filtering the precipitate formed, and then suspending it in a solution of aluminum triethyl.

However, the catalyst obtained by that process utilizing substantial amounts of aluminum triethyl results in only low conversions (7–10%) of the monomeric styrene.

Except when the special method of preparing the catalyst was used, the polystyrene produced with the aid of the catalysts as aforesaid was always obtained by adding a soluble compound of the transition metal to a solution of the organo-metallic compound, in the presence of monomeric styrene and the polymerizate, as noted above, comprised the amorphous polymer.

Surprisingly, we have found that, by using a new method for the preparation of the catalyst, it is possible to selectively polymerize styrene directly to a polymerizate consisting for at least 90% of isotactic macromolecules, with high yields and relatively high polymerization rates.

We have discovered, in the first place, that in the polymerization of styrene the order in which the various components used in the reaction system are brought into contact with each other has a very considerable influence on the course of the polymerization and on the properties of the polymer obtained. This is demonstrated in Table I below, which shows the typical results of four polymerization runs in which, for each run, the reactants were introduced into the reactor in a different order, all other conditions being the same.

The fixed conditions were:

| | |
|---|---|
| Catalyst | 0.01 mol $Al(C_2H_5)_3$, 0.00345 mol $TiCl_4$. |
| Monomer | 18 g. styrene. |
| Solvent | 50 cc. benzene. |
| Temperature | 70° C. |
| Reaction time | 7 hours. |

TABLE I

| Order of introduction of the reactants | Total percent | Percent conversion | | | Isotactic polymer | |
|---|---|---|---|---|---|---|
| | | To amorphous polymers | To oily polymers | To isotactic polymers | Percent on the total | Percent on the solid polymer |
| (Styrene+triethyl aluminum)+ $TiCl_4$ | 40.6 | 18.7 | 8.2 | 13.7 | 33.7 | 42.3 |
| Triethyl aluminum+$TiCl_4$+styrene | 27.0 | 11.3 | 13.7 | 2.0 | 7.4 | 15.0 |
| $TiCl_4$+triethyl aluminum+styrene | 43.1 | 0.3 | 3.6 | 39.2 | 91.0 | 99.2 |
| $TiCl_4$+(styrene+triethyl aluminum) | 73.2 | 4.9 | 21.6 | 46.7 | 63.8 | 90.5 |

The superiority of the results obtained, with respect to the yield of isotactic polystyrene, by adding the aluminum triethyl to the titanium tetrachloride solution is readily apparent from a consideration of the data presented in Table I.

The present invention is concerned, therefore, with the improved method for polymerizing styrene directly to a polymerizate consisting substantially to exclusively of isotactic macromolecules in which the catalyst is prepared from a transition metal compound and a metallo-organic compound, and a solution of the metallo-organic compound is added to a solution of the transition metal compound, prior to or simultaneously with the introduction of the styrene to be polymerized.

The styrene may be added either subsequently to the addition of the metallo-organic compound solution, or together with it. In the former case, a maximum of selectivity of the reaction is obtained, the monomeric styrene being converted to a solid product consisting practically of polystyrene which is 100% isotactic. In the latter case, a higher conversion of styrene to solid product containing more than 90% isotactic polystyrene is obtained.

The activity of the catalyst prepared by introducing the solution of the organo-metallic compound into the solution of the transition metal compound remains practically unchanged for a few minutes, shows a slight decrease after about 15–20 minutes and then reaches, rather rapidly, a minimum constant value. Because of this relative stability of the catalyst, it is possible to prepare it separately, and to later introduce the catalyst into the reactor containing the monomeric styrene.

It may be convenient to prepare the catalyst, and then carry out the polymerization separately. We have found that the activity of the catalyst prepared in accordance with this invention is greatly influenced by the temperature at which the reaction of the transition metal compound and organo-metallic compound is carried out. In the case of titanium tetrachloride and aluminum triethyl, for example, the catalyst has maximum activity when the reaction is carried out at about 100° C. On the other hand, the percent conversion of the styrene to isotactic polymer is higher when the catalyst is prepared at temperatures below 100° C.

We have found, further, that the ratio between the quantities of aluminum triethyl and titanium tetrachloride from which the catalyst is prepared has an important influence on the course of the polymerization reaction. In fact, both the quantity and the quality of the total polymerization product vary considerably with the component ratio of the catalytic mixture.

The accompanying graph illustrates the results obtained in several runs in which, all other conditions being equal, the ratio between the components of the catalytic mixture was varied for each run. The particular components used were aluminum triethyl and titanium tetrachloride. In each run, 18 gms. of styrene and 50 ccs. of benzene were used, the runs were carried out at a temperature of 70° C., and the reaction time was 7 hours.

In the graph, the mole ratios $$\frac{Al(C_2H_5)_3}{TiCl_4}$$

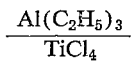

are indicated on the abscissae, and the weight in grams of the polymer obtained and the percent conversion of the monomer are indicated on the ordinates. The black dots designate the isotactic polymer and the blank dots designate the amorphous polymer.

It will be observed from a study of the graph that the amorphous polymer, which is formed practically exclusively when low $Al(C_2H_5)_3/TiCl_4$ ratios are used, disappears at ratios higher than 2.5–3, whereas the isotactic polymer which is almost completely absent from the product at $Al(C_2H_5)_3/TiCl_4$ ratios below 2, is formed at a notably increasing rate as the ratio of aluminum triethyl to titanium tetrachloride increases, reaching a maximum for a limited range of ratios between 2 and 3.

With further increase in the aluminum triethyl content of the catalytic mixture above the ratio corresponding to the maximum conversion rate, a gradual decrease in the amount of isotactic polymer formed is observed.

At a mole ratio of $Al(C_2H_5)_3$ to $TiCl_4$ higher than 10, the polymerization proceeds only slowly. The value of the optimum ratio for the production of the isotactic polystyrene may vary somewhat, depending on the degree of purity of the reactants employed, and particularly on the presence or absence of air during the polymerization.

The solvents which my be used in preparing the catalyst are hydrocarbon solvents which are inert to the catalyst and in which the polymerization of the styrene may be effected. Suitable solvents include paraffinic hydrocarbons such as, for instance, a light gasoline substantially free of olefinic bonds, n-heptane, iso-octane, and so on. Anhydrous benzene also may be used.

When pure n-heptane is used as the solvent, it has been observed that the amorphous polymer practically disappears when the $Al(C_2H_5)_3/TiCl_4$ ratio is equal to or slightly lower than 2.

The following examples are given to illustrate the present process. It is to be understood that these examples are not intended to be limitative. For instance, in most of the examples, the polymerization is carried out with relatively dilute solutions of styrene (below 30% by volume of monomer). This was done in order to obtain the reproducible results desired for a thorough study of the reaction mechanism. However, higher concentrations of styrene can be and have been used and result in higher reaction rates and higher yields of polymer per unit of catalyst used, as is apparent from Examples 3 and 18.

The polymers obtained by the present method have very high molecular weight. As is apparent from the examples, the molecular weight of the polymers can be influenced to a certain extent by varying the $Al(C_2H_5)_3/TiCl_4$ ratio. A decrease in the molecular weight of the polymer as compared to the molecular weight it would normally have can be obtained in the following ways:

(1) By increasing the polymerization temperature,
(2) By increasing the amount of catalyst used with a given amount of monomer,
(3) By decreasing the concentration of the monomer in the inert solvent.

Thus, if it is desired to produce isotactic polystyrenes of lower molecular weight adapted to more ready working of the polymer in the production of shaped articles thereof, this can be accomplished by adopting any one of expedients (1) to (3).

The effect of increasing the polymerization temperature can be observed from the data given in Table II below. These data were obtained by examination of the polystyrenes produced by the runs described in Examples 8, 9 and 10, but at different temperatures.

TABLE II

| Temperature, ° C. | Isotactic polystyrene | |
|---|---|---|
| | Intrinsic viscosity (in tetralin at 100° C.) | Molecular weight |
| 160 | 1.60 | 600,000 |
| 130 | 2.0 | 1,200,000 |
| 100 | 4.3 | 2,600,000 |
| 85 | 4.95 | 3,200,000 |
| 70 | 6.0 | 4,000,000 |
| 40 | 7.5 | 5,800,000 |

The decreasing effect on the molecular weight of the polystyrene of temperatures between 100° C. and 170° C. is apparent.

The influence exerted by a change in the concentration of monomeric styrene in the solvent is shown by the data given in Table III below. These data show the effect on the intrinsic viscosity of the polymers obtained as described in Example 18, while maintaining the total volume of the liquid constant and varying the concentration of the monomer.

TABLE III

| Concentration, percent by volume of monomer | Isotactic polymer intrinsic viscosity (in tetralin at 100° C.) |
|---|---|
| 5 | 1.8 |
| 10 | 2.7 |
| 20 | 3.6 |
| 40 | 5.3 |
| 60 | 5.7 |
| 80 | 6.0 |

The decreasing effect on the intrinsic viscosity of the polymer obtained by using monomer concentration between 5% and 20% by volume is apparent.

By taking advantage of the influence of these various factors on the molecular weight of the polymers produced, it is possible to vary the molecular weights between values of the order of a few million down to values of the order of some ten thousands.

*Example 1*

0.00345 mol titanium tetrachloride dissolved in 40 cc. benzene are placed in a 250 cc. glass flask provided with a stirrer, a thermometer, and a dropping funnel, immersed in a thermostat bath set at 70° C. and maintained in an atmosphere of nitrogen. A solution of 0.01 mol aluminum triethyl in 10 cc. benzene is slowly added dropwise at a temperature of 70° C. 18 g. styrene are then added. The reaction is carried out at 70° C. for 7 hours, then an excess of methanol is added, thereby precipitating a product which is found to consist of 0.05 g. of an acetone-soluble (amorphous) polymer and 7.05 g. of an acetone-insoluble (isotactic) polymer. From the methanolic washing 0.65 g. of oily products are recovered by extraction with benzene. The conversion is 43.1% and the percentages of isotactic polymer on the total product and on the solid product are of 91 and 99.2% respectively.

*Example 2*

0.00345 mol titanium tetrachloride dissolved in 40 cc. benzene are placed in the reaction apparatus described previously, kept in an atmosphere of dry nitrogen. A solution of 0.01 mol aluminum triethyl, 18 g. styrene and 10 cc. benzene are slowly added dropwise at a temperature of 70° C. After 7 hours of reaction, the reaction product, treated as described in the foregoing example, consists of 3.89 g. of oily product, 0.88 g. of amorphous polymer and 8.40 g. of isotactic polymer. The conversion is 73.2%. The isotactic polymer corresponds to 63.8% of the total product and to 90.5% of the solid product.

*Example 3*

A solution of 0.0039 mol titanium tetrachloride in 100 cc. benzene is placed in a 500 cc. flask provided with a stirrer, a thermometer and a dropping funnel, heated to 70° C. by means of an oil bath and arranged so that it can be maintained in an inert gas atmosphere. 10 g. styrene containing 0.010 mol aluminum triethyl are slowly added dropwise while stirring. After two minutes, further 260 g. styrene are slowly added during an interval of about 1 hour. When addition is completed, stirring is stopped and the mass is allowed to react for 24 hours at 70° C. By coagulation and washing with methanol, 101.3 g. of polymer, corresponding to a conversion of 37.6% based on the monomer used, are obtained. Of this product, 7.3 g. are soluble in acetone and 94.0 g. are insoluble in boiling acetone. The isotactic polymer represents therefore 92.7% of the solid polymer produced and 34.8% of the monomer used. From the methyl alcohol used to separate and wash the polymer from the reaction mixture, 4.50 g. of oily products, corresponding to 1.6% of the monomer used, are obtained.

*Example 4*

0.00368 mol titanium tetrachloride in 40 cc. benzene are introduced into a 250 cc. glass flask, provided with a stirrer, a thermometer and a dropping funnel, heated to 70° C. by immersion in a thermo-regulated oil bath and kept in an atmosphere of dry nitrogen. 0.010 mol aluminum triethyl in 10 cc. benzene are slowly added dropwise while stirring. One minute after the end of this operation, 18 g. of monomeric styrene are added and the mixture is allowed to react for 5 hours at 70° C. By the treatments described previously 0.02 g. of amorphous polymer, 6.62 g. of isotactic polystyrene and 1.20 g. of oily products are obtained. The monomer conversion to isotactic polymer is 36.8% and the percentage of isotactic polymer on the total is about 84%.

*Example 5*

0.00368 mol titanium tetrachloride in 40 cc. benzene are introduced under nitrogen into the reaction apparatus described previously. 0.010 mol aluminum triethyl in 10 cc. benzene are slowly added dropwise, while stirring, at a temperature of 70° C. After 20 minutes, 18 g. styrene are added and the mixture is allowed to react at 70° C. for 5 hours. By coagulation with methyl alcohol and extraction with acetone, 0.07 g. of amorphous polymer and 6.40 g. (corresponding to a yield of 35.6% based on the monomer used) of isotactic polymer are obtained. 1.0 g. of oily products is recovered from the methyl alcohol.

*Example 6*

0.00368 mol titanium tetrachloride in 40 cc. benzene are introduced under nitrogen into the reaction apparatus described previously. 0.010 mol of aluminum triethyl in 10 cc. benzene are added slowly dropwise, while stirring, at 70° C. One hour after this operation, 18 g. styrene are introduced and the reaction is carried out for 5 hours at 70° C. 0.09 g. of amorphous polystyrene soluble in acetone, 0.78 g. of oily products soluble in methyl alcohol and 3.47 g. of isotactic polymer, corresponding to a conversion of 19.3% are obtained.

*Example 7*

10 cc. benzene and 0.010 mol aluminum triethyl are introduced dropwise at 70° C. into the usual reaction apparatus kept under nitrogen and containing 0.00368 mol titanium tetrachloride and 40 cc. benzene. Two hours after the end of this operation, 18 g. styrene are added and the mixture is allowed to react for 5 hours at 70° C. 0.97 g. of oily products, 0.20 g. of amorphous polymer and 3.30 g. of isotactic polystyrene, corresponding to 18.3% of the monomer used, are isolated by the procedure described.

*Example 8*

0.0035 mol titanium tetrachloride in 40 cc. tetralin are placed in a 250 cc. flask provided with a stirrer, a thermometer and a dropping funnel, immersed in a thermostat bath and kept under nitrogen. The solution is heated to 40° C. and 0.00945 mol aluminum triethyl in 10 cc. tetralin are added dropwise while stirring. After 2–3 minutes, 18 g. styrene are added and the mixture is allowed to react 7 hours at 40° C. By the separation procedures already described, 0.11 g. amorphous polystyrene, and 0.73 g. of isotactic polymer, corresponding to a conversion of 4.05%, are obtained.

*Example 9*

0.0035 mol titanium tetrachloride in 40 cc. tetralin are introduced under nitrogen into the apparatus described previously. The thermostat bath is heated to 100° C. and 0.00945 mol aluminum triethyl are added dropwise while stirring. After 2–3 minutes, 18 g. styrene are added and the reaction is carried out for 7 hours at 100° C. 1.60 g. of amorphous polymer and 8.93 g. of isotactic polystyrene, corresponding to a conversion of 49.1% are obtained.

*Example 10*

0.0035 mol titanium tetrachloride in 40 cc. tetralin are introduced under nitrogen into the apparatus described. The solution is heated to 100° C. and 0.00945 mol aluminum triethyl are slowly added while stirring. The mixture is cooled rapidly by adjusting the thermostat bath to 40° C. and, 2–3 minutes after the addition of the aluminum triethyl, 18 g. styrene are added. The mixture is allowed to react at 40° C. for 7 hours. 0.21 g. of amorphous polymer and 3.68 g. (20.4%) of isotactic polymer are obtained.

*Example 11*

A solution of 0.0035 mol titanium tetrachloride in 40 cc. tetralin is placed in the usual apparatus kept under nitrogen. The flask is heated to 40° C. by immersion in a thermo-regulated oil bath and 10 cc. tetralin containing 0.00945 mol aluminum triethyl are added while stirring. The mixture is then heated rapidly to 100° C. and 18 g. styrene are added. After 7 hours of reaction at 100° C., 4.08 g. of amorphous polymer soluble in acetone and 0.75 g. of isotactic polystyrene, corresponding to 4.17% of the initial monomer, are obtained.

*Example 12*

0.0035 mol titanium tetrachloride in 40 cc. tetralin are introduced into the already described apparatus kept under nitrogen and heated to 130° C., and 0.00945 mol aluminum triethyl in 100 cc. tetralin are slowly added dropwise while stirring. After 2–3 minutes, 18 g. styrene are added and the reaction is allowed to proceed for 7 hours at 130° C. 5.95 g. of amorphous polymer and 4.89 g. of isotactic polystyrene, corresponding to a conversion of 27.3% based on the styrene used, are obtained.

*Example 13*

40 cc. benzene containing 0.00348 mol titanium tetrachloride are introduced at a temperature of 70° C. into the already described apparatus kept in an atmosphere of dry nitrogen. 0.00355 mol aluminum triethyl in 10 cc. benzene are added dropwise while stirring.

$$(Al(C_2H_5)_3/TiCl_4=1.02)$$

18 g. styrene are then added and the reaction is allowed to proceed for 7 hours. After the washing and extraction treatments previously described, 7.99 g. of amorphous polystyrene and 0.19 g. of isotactic polystyrene are obtained. From the methyl alcohol used to coagulate and wash the solid polymer, 5.30 g. of oily products are recovered. The isotactic polystyrene formed has an intrinsic viscosity in tetralin at 100° C. of 3.37.

*Example 14*

0.00348 mol titanium tetrachloride in 40 cc. benzene are introduced under nitrogen into the usual apparatus kept at 170° C. 0.00707 mol aluminum triethyl in 10 cc. benzene ($Al(C_2H_5)_3/TiCl_4=2.30$) and then 18 g. styrene are added. After 7 hours of reaction, 4.23 g. of oily products, 0.54 g. of amorphous polystyrene and 0.89 g. of isotactic polystyrene are obtained. The intrinsic viscosity in tetralin at 100° C. of the isotactic polystyrene is 4.50.

*Example 15*

0.00885 mol aluminum triethyl in 10 cc. of benzene are slowly added dropwise while stirring to 0.00348 mol titanium tetrachloride in 40 cc. benzene contained in the already described apparatus, kept at 70° C. under nitrogen ($Al(C_2H_5)_3/TiCl_4=2.54$). 18 g. styrene are added and the reaction is allowed to proceed for 7 hours at 70° C. By the usual washing and extraction procedures, 0.57 g. of oily products, 0.14 g. of amorphous polystyrene and 7.17 g. of isotactic polystyrene are obtained. The intrinsic viscosity in tetralin at 100° C. of the isotactic polystyrene is 5.40.

*Example 16*

0.00348 mol titanium tetrachloride in 40 cc. benzene are introduced under nitrogen into the usual apparatus. At a temperature of 70° C. 0.0143 mol aluminum triethyl ($Al(C_2H_5)_3/TiCl_4=4.11$) in 10 cc. benzene and subsequently 18 g. styrene are added. After 7 hours of reaction, a product is obtained which comprises 0.85 g. of oily polymers and 3.80 g. of an isotactic polymer whose intrinsic viscosity in tetralin at 100° C. is 3.40.

*Example 17*

0.00087 mol titanium tetrachloride in 40 cc. benzene are introduced under nitrogen into the apparatus described above. At 70° C. 0.0087 mol aluminum triethyl in 10 cc. benzene ($Al(C_2H_5)_3/TiCl_4=10$) and subsequently 18 g. styrene are added. After 7 hours of reaction, 0.35 g. of oily products and 0.03 g. of isotactic polystyrene are obtained. The intrinsic viscosity of the latter, as determined in tetralin solution at 100° C., is 1.75.

*Example 18*

1.1 g. aluminum triethyl in 10 cc. benzene and then 80 cc. monomeric styrene are placed in the already described apparatus, kept at 70° C. under nitrogen and containing 0.6 g. titanium tetrachloride in 10 cc. benzene. After 5 hours of reaction and after the already described washing and extraction procedures, 0.17 g. of an acetone-soluble amorphous polymer, 0.80 g. of oily low polymers and 23.90 g. of isotactic polystyrene are obtained.

For purposes of comparison, the following run (A) was made in which the titanium compound was added to a mixture of styrene and the aluminum alkyl compound.

(A) A solution of 0.00345 mol titanium tetrachloride in 10 cc. benzene is slowly added dropwise, while stirring, into a 250 cc. glass flask provided with a stirrer, a thermometer and a dropping funnel, immersed in a thermostat bath set at 70° C., and maintained in an atmosphere of nitrogen, containing 18 g. monomeric styrene, 0.01 mol aluminum triethyl and 40 cc. benzene. After 7 hours of reaction an excess of methanol is added; the polymer precipitated is extracted for 5 hours with boiling acetone. It leaves a residue of 2.46 g. of isotactic polymer, corresponding to 13.7% of the styrene used. The acetone solution of the amorphous polymer is poured into methanol and, by filtering and drying, 3.37 g. of amorphous polystyrene, corresponding to 18.7% of the monomer used, are recovered. The methyl alcohol used initially to decompose the catalytic mixture and to precipitate and wash the polymer is evaporated and extracted with benzene. After removal of the benzene, 1.47 g. of oily products, corresponding to 8.2% of the initial monomer, are obtained. The isotactic polymer obtained represents 33.7% of the total product, and 42.3% of the solid polymer.

Another run (B) was made, to determine the course of the polymerization when the reactants are brought into contact in the following order: organo-metallic compound-transition metal compound-styrene.

(B) 0.01 mol aluminum triethyl in 40 cc. benzene are introduced at a temperature of 70° C. into an apparatus similar to that described above, kept in an atmosphere of nitrogen. 0.00345 mol titanium tetrachloride dissolved in 10 cc. of benzene are then slowly added dropwise and subsequently 18 g. styrene. After 7 hours of reaction, the total product, treated as described in Example 1, consists of 2.03 g. of amorphous polymer (11.3%), 2.46 g. of oily product (13.7%), and 0.36 g. of isotactic polystyrene (2.0%). The latter corresponds to 7.4% of the total reaction product and to 15.0% of the solid product formed.

The superior results obtained by the procedure of Examples 1–18 will be readily apparent by a comparison thereof with the results of runs A and B.

Results similar to those shown in Examples 1–18 are obtained using other transition metal compounds and other metallo-organic compounds in the preparation of the catalyst, provided the solution of the metallo-organic compound is added to the solution of the transition metal compound prior to or with the monomeric styrene.

By transition metal, we mean the metals so described and discussed at pages 103–106 and in Chapter 20 of "Inorganic Chemistry," by T. Moeller, published by Wiley & Sons, New York, 1952, and including zirconium, hafnium, thorium, vanadium, niobium, tantalum, chromium, molybdenum, tungsten and uranium.

In the practice of this invention, the transition metal compounds used are those in which the metal has the maximum valence corresponding to its position in the Periodic Table. Thus, the titanium compound used is titanium chlorides. Other compounds of the transition metal which meet the foregoing requirement include vanadium tetrachloride, wherein vanadium is penta- or tetravalent, zirconium tetrachloride, and the corresponding compounds of the other aforesaid transition metals.

The metallo-organic compound comprises a substance or mixture of substatnces from the group consisting of single and complex compounds the molecules of which contain a metal from the 2nd and 3rd groups of the Periodic Table, including magnesium, zinc, cadmium and aluminum. Typical compounds are triethyl aluminum, diethyl aluminum monochloride, diethyl zinc and so on.

The valences of the aforesaid element are linked to the same or different alkyl radicals containing 2 to 16 carbon atoms, for instance, to ethyl, propyl, butyl radicals, etc. When a metal of the 3rd group of the Periodic Table is used, one valence thereof may be satisfied by halogen, hydrogen, or an alkoxy group.

It appears that reaction of the transition metal compound with the metallo-organic compound results in a catalyst which contains, at least at the surface, linkages between metal atoms and alkyl groups, alkenyl groups, or hydrogen.

Transition metal compounds other than titanium tetrachloride and as defined above, and metallo-organic compounds other than aluminum triethyl and as defined above may be substituted for those specific reactants in the examples. Since these and other changes may be made in practicing the invention without departing there-

What is claimed is:

1. A process for catalytically polymerizing styrene to a polystyrene consisting for at least 90% of isotactic macromolecules, which process comprises preparing the catalyst at a temperature between 70° C. and 100° C. by adding an aluminum trialkyl to a titanium chloride, in a molar ratio between the aluminum trialkyl and titanium chloride higher than 2:1 and not higher than 3:1, at said temperature and while avoiding any separate contact between the styrene and titanium chloride prior to adding the aluminum trialkyl to the titanium chloride, and then polymerizing the styrene in contact with the catalyst thus prepared at a polymerization temperature between 70° C. and 100° C.

2. The process according to claim 1, characterized in that the styrene to be polymerized is added to the titanium chloride simultaneously with the aluminum trialkyl.

3. The process according to claim 1, characterized in that the styrene to be polymerized is brought into contact with the catalyst after the aluminum trialkyl has been added to the titanium chloride.

4. The process according to claim 1, characterized in that the molar ratio of the aluminum trialkyl to the titanium chloride is between 2.5:1 and 3:1.

5. The process according to claim 1, characterized in that the catalyst is prepared by adding a solution of the aluminum trialkyl in a hydrocarbon solvent inert to the catalyst to a solution of the titanium chloride in a hydrocarbon solvent inert to the catalyst.

6. The process according to claim 1, further characterized in that the polymerization of the styrene to the substantially isotactic homopolymer in contact with the catalyst is carried out in a hydrocarbon solvent inert to the catalyst and the styrene is added to the system in a concentration of from 5% to 20% by volume.

References Cited in the file of this patent

UNITED STATES PATENTS

| | | |
|---|---|---|
| 2,721,189 | Anderson et al. | Oct. 18, 1955 |
| 2,827,446 | Breslow | Mar. 18, 1958 |
| 2,832,759 | Nowlin et al. | Apr. 29, 1958 |
| 2,839,518 | Brebner | June 17, 1958 |

FOREIGN PATENTS

| | | |
|---|---|---|
| 526,101 | Italy | Mar. 14, 1955 |
| 538,782 | Belgium | Dec. 6, 1955 |